(12) United States Patent
Bright et al.

(10) Patent No.: US 8,630,040 B2
(45) Date of Patent: Jan. 14, 2014

(54) MULTI-COMPONENT FILMS FOR OPTICAL DISPLAY FILTERS

(75) Inventors: Clark I. Bright, Tucson, AZ (US); John D. Le, Woodbury, MN (US); Robert C. Fitzer, North Oaks, MN (US); Stephen P. Maki, North St. Paul, MN (US); Christopher S. Lyons, St. Paul, MN (US); Hun Jeong, Yongin (KR)

(73) Assignee: 3M Innovative Properties Company, St. Paul, MN (US)

( * ) Notice: Subject to any disclaimer, the term of this patent is extended or adjusted under 35 U.S.C. 154(b) by 846 days.

(21) Appl. No.: 12/255,025

(22) Filed: Oct. 21, 2008

(65) Prior Publication Data

US 2009/0109537 A1 Apr. 30, 2009

Related U.S. Application Data

(60) Provisional application No. 60/983,781, filed on Oct. 30, 2007.

(51) Int. Cl.
*G02B 1/10* (2006.01)
*H01J 29/88* (2006.01)

(52) U.S. Cl.
USPC ............ 359/585; 359/580; 359/586; 313/479

(58) Field of Classification Search
USPC ........... 359/585; 313/528, 112, 479; 428/212, 428/336
See application file for complete search history.

(56) References Cited

U.S. PATENT DOCUMENTS

| | | |
|---|---|---|
| 3,529,074 A | 9/1970 | Lewis |
| 3,601,471 A | 8/1971 | Seddon |
| 3,682,528 A | 8/1972 | Apfel et al. |
| 3,682,582 A | 8/1972 | Hirshfeld et al. |
| 4,234,654 A | 11/1980 | Yatabe et al. |
| 4,337,990 A | 7/1982 | Fan et al. |
| 4,463,047 A | 7/1984 | Matteucci et al. |
| 4,565,719 A | 1/1986 | Phillips et al. |
| 4,590,118 A | 5/1986 | Yatabe et al. |
| 4,600,627 A | 7/1986 | Honda et al. |
| 4,639,069 A | 1/1987 | Yatabe et al. |
| 4,645,714 A | 2/1987 | Roche et al. |
| 4,696,719 A | 9/1987 | Bischoff |
| 4,722,515 A | 2/1988 | Ham |
| 4,782,216 A | 11/1988 | Woodard |

(Continued)

FOREIGN PATENT DOCUMENTS

| | | |
|---|---|---|
| CN | 1675059 A | 9/2005 |
| EP | 0 691 553 A2 | 1/1996 |

(Continued)

OTHER PUBLICATIONS

Affinito et al., Polymer Oxide Transparent Barrier Layers, Society of Vacuum Coaters 39th Annual Technical Conference Proceedings, 1996, pp. 392-397.

(Continued)

*Primary Examiner* — Audrey Y Chang
(74) *Attorney, Agent, or Firm* — Stephen F. Wolf; James A. Baker

(57) ABSTRACT

Provided are multi-component films useful as optical display filters. The optical display filters include a multi-layer stack that contains at least one organic layer. The filters have high visible light transmittance, low visible light reflection, and provide electromagnetic interference shielding.

22 Claims, 7 Drawing Sheets

(56) References Cited

U.S. PATENT DOCUMENTS

| | | |
|---|---|---|
| 4,786,783 A | 11/1988 | Woodard |
| 4,799,745 A | 1/1989 | Meyer et al. |
| 4,842,893 A | 6/1989 | Yializis et al. |
| 4,873,139 A | 10/1989 | Kinosky |
| 4,910,090 A | 3/1990 | Kuhlman |
| 4,954,371 A | 9/1990 | Yializis |
| 5,018,048 A | 5/1991 | Shaw et al. |
| 5,032,461 A | 7/1991 | Shaw et al. |
| 5,071,206 A | 12/1991 | Hood et al. |
| 5,097,800 A | 3/1992 | Shaw et al. |
| 5,125,138 A | 6/1992 | Shaw et al. |
| 5,324,374 A | 6/1994 | Harmand et al. |
| 5,332,888 A | 7/1994 | Tausch et al. |
| 5,377,045 A | 12/1994 | Wolfe et al. |
| 5,440,446 A | 8/1995 | Shaw et al. |
| 5,510,173 A | 4/1996 | Pass et al. |
| 5,529,849 A | 6/1996 | D'Errico |
| 5,540,446 A | 7/1996 | Felsen |
| 5,547,908 A | 8/1996 | Furuzawa et al. |
| 5,725,909 A | 3/1998 | Shaw et al. |
| 5,773,102 A | 6/1998 | Rehfeld |
| 5,783,049 A | 7/1998 | Bright et al. |
| 6,034,813 A | 3/2000 | Woodard et al. |
| 6,045,864 A | 4/2000 | Lyons et al. |
| 6,104,530 A | 8/2000 | Okamura et al. |
| 6,107,357 A | 8/2000 | Hawker et al. |
| 6,132,882 A | 10/2000 | Landin et al. |
| 6,214,422 B1 | 4/2001 | Yializis |
| 6,231,939 B1 | 5/2001 | Shaw et al. |
| 6,252,703 B1 | 6/2001 | Nakamura et al. |
| 6,352,761 B1 | 3/2002 | Hebrink et al. |
| 6,357,880 B2 | 3/2002 | Epstein et al. |
| 6,368,699 B1 | 4/2002 | Gilbert et al. |
| 6,376,065 B1 | 4/2002 | Korba et al. |
| 6,399,228 B1 | 6/2002 | Simpson |
| 6,440,642 B1 | 8/2002 | Shelnut et al. |
| 6,459,514 B2 | 10/2002 | Gilbert et al. |
| 6,565,982 B1 | 5/2003 | Ouderkirk et al. |
| 6,579,423 B2 | 6/2003 | Anzaki et al. |
| 6,641,900 B2 | 11/2003 | Hebrink et al. |
| 6,650,478 B1 | 11/2003 | DeBusk et al. |
| 6,673,438 B1 | 1/2004 | Bond et al. |
| 6,679,971 B2 * | 1/2004 | Tone et al. ............... 156/306.6 |
| 6,737,154 B2 | 5/2004 | Jonza et al. |
| 6,783,349 B2 | 8/2004 | Neavin et al. |
| 6,797,396 B1 | 9/2004 | Liu et al. |
| 6,808,658 B2 | 10/2004 | Stover |
| 6,811,867 B1 | 11/2004 | McGurran et al. |
| 6,818,291 B2 * | 11/2004 | Funkenbusch et al. ....... 428/336 |
| 6,830,713 B2 | 12/2004 | Hebrink et al. |
| 6,833,391 B1 | 12/2004 | Chisholm et al. |
| 6,929,864 B2 | 8/2005 | Fleming et al. |
| 6,933,051 B2 | 8/2005 | Fleming et al. |
| 6,946,188 B2 | 9/2005 | Hebrink et al. |
| 6,965,191 B2 * | 11/2005 | Koike et al. ................... 313/112 |
| 7,018,713 B2 | 3/2006 | Padiyath et al. |
| 7,148,360 B2 | 12/2006 | Flynn et al. |
| 7,150,907 B2 | 12/2006 | Hebrink et al. |
| 7,169,328 B2 | 1/2007 | Miller et al. |
| 7,186,465 B2 | 3/2007 | Bright |
| 7,215,473 B2 | 5/2007 | Fleming |
| 7,238,401 B1 | 7/2007 | Dietz |
| 7,261,950 B2 | 8/2007 | Fleming et al. |
| 2002/0022156 A1 * | 2/2002 | Bright ........................... 428/698 |
| 2003/0228476 A1 | 12/2003 | Buhay et al. |
| 2004/0032658 A1 | 2/2004 | Fleming |
| 2004/0033369 A1 | 2/2004 | Fleming et al. |
| 2004/0241396 A1 | 12/2004 | Jing et al. |
| 2005/0181123 A1 | 8/2005 | Fleming et al. |
| 2006/0035073 A1 | 2/2006 | Funkenbusch et al. |
| 2006/0055308 A1 | 3/2006 | Lairson et al. |
| 2008/0160185 A1 | 7/2008 | Endle et al. |

FOREIGN PATENT DOCUMENTS

| | | |
|---|---|---|
| EP | 0810452 A2 | 12/1997 |
| EP | 0944299 A2 | 9/1999 |
| JP | 59070558 | 4/1984 |
| JP | 61043555 A | 3/1986 |
| WO | WO 00/26973 | 5/2000 |
| WO | WO 01/58989 | 8/2001 |
| WO | WO 01/96115 | 12/2001 |
| WO | WO 2008/083304 | 7/2008 |
| WO | WO 2008/083308 | 7/2008 |

OTHER PUBLICATIONS

Affinito et al., Vacuum Deposited Polymer/Metal Multilayer Films for Optical Application, Thin Solid Films 270, pp. 43-48, 1995.

Bright, Transparent Barrier Coatings Based on ITO for Flexible Plastic Displays, 13th Conference on Vac. Web Coating, Oct. 17-19, 1999, pp. 247-264.

Da Silva Sobrinho et al., Transparent Barrier Coatings on Polyethylene Terephthalate by Single- and Dual-Frequency Plasma-Enhanced Chemical Vapor Deposition, JVST A (16) Nov/De 1998, pp. 3190-3198.

Shaw et al., A New High Speed Process for Depositing Acrylate Thin Films: An Update, Society of Vacuum Coaters 36th Annual Technical Conference Proceedings, 1993, pp. 348-352.

Shaw et al., A New Vapor Deposition Process for Coating Paper and Polymer Webs, 6th International Vacuum Coating Conference (1992), pp. 18-24.

Shaw et al., Use of Evaporated Acrylate Coatings to Smooth the Surface of Polyester and Polypropylene Film and Aluminum Foil Substrates, RadTech, 1996, pp. 701-707.

Shaw et al., Use of Vapor Deposited Acrylate Coatings to Improve the Barrier Properties of Metallized Film, Society of Vacuum Coaters 37th Annual Technical Conference Proceedings, 1994, pp. 240-247.

U.S. Appl. No. 61/077,002, Bright et al., Title—Method of Making Inorganic or Inorganic/Organic Hybrid Barrier Films, filed Jun. 30, 2008.

* cited by examiner

MULTI-COMPONENT FILMS FOR OPTICAL DISPLAY FILTERS

RELATED APPLICATION

This application claims priority to U.S. Provisional Application No. 60/983,781, filed Oct. 30, 2007, which is herein incorporated by reference in its entirety.

FIELD

Provided are multi-component films useful as optical display filters. The optical display filters are useful as components of active optical devices such as display panels including plasma display panels.

BACKGROUND

The use of electronic devices that include flat panel displays is very popular and is increasing at an accelerating rate. These electronic devices include, for example, flat panel displays that contain electroluminescent (EL) lamps, light-emitting diodes (LEDs), organic light-emitting diodes (OLEDs), or plasma components that create visible radiation—usually in a matrix display. Most of these displays require multiple optical filters to adjust performance characteristics of the display that include the degree of neutrality and level of transmitted color, the level of reflected radiation, the color shift with changes in the viewing angle, and the transmission levels of undesirable near infrared and electromagnetic interference (EMI) radiation.

Optical filters with EMI shielding have been developed that can absorb visible radiation, infrared radiation, adjust color, reduce reflection, and can shield the observer from harmful (EMI) radiation. Usually a number of different optical filters in combination with EMI shielding films, especially films with transparent conductive mesh configurations, have been used to produce the final, desired visual output of the device. Some of these optical filters have employed interference stacks (e.g., Fabry-Perot) of alternating conductors and dielectrics to adjust the optical performance characteristics of the filters, while also providing EMI shielding. The conductors in these stacks are usually metal layers and the dielectrics are usually metal oxides layers. The metal oxide layers can have a very slow deposition rate which can lead to high production costs. The use of multiple optical filters in electronic devices to obtain desired performance characteristics can increase costs, make the devices bulky, and cause considerable loss in transmission of the desired images.

SUMMARY

There is a need for optical filters useful for electronic display devices that are lightweight, low-cost, and that can incorporate multiple desired features into one filter. Also there is a need for optical filters that can be easily tailored during production to adjust visible reflection, visible transmission, and to provide EMI protection without adding more components or cost to the electronic display device. There is also a need for optical filters than can be easily applied to existing electronic display devices. The use of the provided interference stacks (optical filters) with EMI shielding can offer a versatile approach to replacement of multiple optical film layers and EMI shielding to meet the requirements of certain optical displays such as, for example, plasma display panels.

Provided is an optical display filter that includes a flexible, transparent substrate and a multi-layer stack disposed on the substrate, the stack having at least two dyads, wherein at least one of the dyads includes an electrically-conductive layer and a transparent organic layer with a refractive index greater than 1.49, wherein the electrically-conductive layer of at least one dyad is in contact with the substrate and wherein the multi-layer stack disposed on the substrate has an average reflection of less than 8% of actinic radiation between the wavelengths of 450 nm and 650 nm, an average light transmission above 40% of actinic radiation between the wavelengths of 450 nm and 650 nm, and electromagnetic interference shielding of at least 10 dB for frequencies in the range of 100 MHz to 1 GHz.

In this document the articles "a", "an", and "the" are used interchangeably with "at least one" to mean one or more of the elements being described;

"alloy" refers to a composition of two or more metals that have physical properties different than those of any of the metals by themselves;

"contiguous" refers to touching or sharing at least one common boundary;

"dielectric" refers to material that is less conductive than metallic conductors such as silver, and can refer to semiconducting materials, insulators, or metal oxide conductors such as indium-tin-oxide (ITO);

"dyad" refers to a pair of layers that includes an electrically-conducting layer and a spacer layer than can be a dielectric layer or a combination of dielectric layers;

"electromagnetic interference shielding" refers to electromagnetic interference shielding in far field";

"Fabry-Perot stack" or "FP stack" refers to more than one contiguous dyad; and

"viewing angle" refers to the angle between an observer and a line perpendicular to the plane of a flat panel display such as a plasma display panel and is expressed in degrees.

The optical display filters described herein can exhibit one or more advantages by providing lightweight, low-cost films that can be easily applied to an electronic display device and that can provide multiple features in one filter. These features can include low average reflection of less than 8% of actinic radiation between the wavelengths of 450 nm and 650 nm, high average transmission of above 40% of actinic radiation between the wavelengths of 450 nm and 650 nm, and average effective EMI shielding with sheet resistance of less than 100 ohms/square. Additionally these filters can provide a wide viewing angle without significant perceived color shift and can assure low transmittance of infrared radiation between 800 nm and 2500 nm. These filters can be useful on many electronic devices and can be particularly useful on plasma display panels and touch screen panels.

The details of one or more embodiments are set forth in the accompanying drawings and description below. Other features, objects, and advantages will be apparent from the description and drawings, and from the claims.

DETAILED DESCRIPTION

Figure 1:
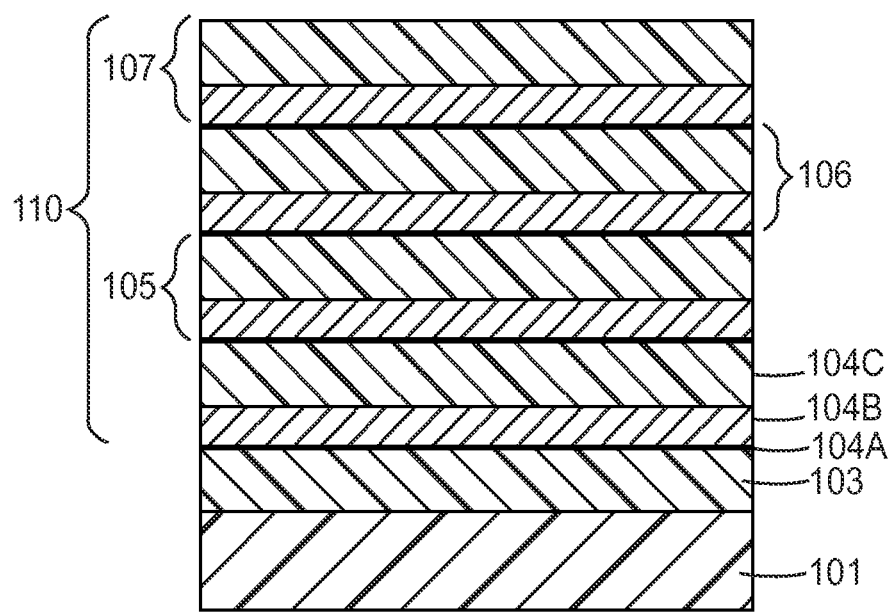
FIG. 1 is a cross-sectional drawing of one embodiment of an optical display filter of this disclosure.

The recitation of numerical ranges includes all numbers within that range (e.g., 1 to 5 includes 1, 1.5, 2, 2.75, 3, 3.80, 4, and 5). All numbers are herein assumed to be modified by the term "about".

Provided are multi-component films useful as optical display filters. The optical display filters can be useful as components of active optical devices such as display panels including plasma display panels. The multi-component films include a substrate or support. A variety of substrates can be employed. Substrates can vary with applications. Substrates can be, but are not limited to, polymeric films, lenses, glasses, windows, polarizer films, or wafers. The substrates can be transparent or opaque, smooth or textured, uniform or non-uniform, and/or flexible or rigid. Supports can also contain other coatings or compounds, for example, abrasion-resistant coatings (hardcoats) or absorbing dyes. Preferred supports are flexible materials that can be roll-to-roll processed. Preferred supports also can have a visible light transmission of at least about 50% at 550 nm. Particularly preferred supports are flexible plastic materials including thermoplastic films such as polyesters (e.g., PET), polyacrylates (e.g., poly(methyl methacrylate), PMMA), polycarbonates, polypropylenes, high or low density polyethylenes, polyethylene naphthalates, polysulfones, polyether sulfones, polyurethanes, polyamides, polyvinyl butyral, polyvinyl chloride, polyvinylidenedifluoride (PVDF), fluorinated ethylene propylene (FEP), and polyethylene sulfide; and thermoset films such as cellulose derivatives, polyimides, polyimide benzoxazoles, polybenzoxazoles, and high $T_g$ cyclic olefin polymers. The support can also be a transparent multilayer optical film ("MOF") coated with at least one crosslinked polymer layer, such as those described in U.S. Pat. No. 7,215,473 (Fleming). Supports made of PET and MOF are especially preferred. Preferably the support has a thickness of from about 0.01 mm to about 1 mm.

The provided optical display filters include a multi-layer stack disposed either directly on the substrate or, optionally, with a basecoat polymer layer between the substrate and the multi-layer stack. The multi-layer stack includes at least two dyads wherein at least one dyad comprises an electrically-conductive layer in contact with a transparent organic layer having a high refractive index greater than 1.49. In this application, a dyad is a two-layered structure that includes a thin electrically-conductive layer and a dielectric (spacer layer) which can include a dielectric material or a combination of more than one material that has dielectric-like optical properties at visible wavelengths. The dyad can be a structure that has an electrically conductive layer or layers in series with a spacer layer. The electrical resistivity of the conductive layer can be significantly less than that of the spacer material. In some cases the resistivity of the conductor layer can be less than about 1 percent of that of the spacer layer. In one embodiment, a dyad can consist of a layer structure such as Ag/polymer/aluminum silicate. In this embodiment, the spacer layer includes two materials—polymer and aluminum-silicon oxide. In another embodiment a dyad can have a structure Ag/ITO/polymer. In this embodiment the conductive layer is Ag and the spacer layer includes two materials—ITO and a polymer. In another embodiment, a dyad can have a structure: metal/semiconductor/polymer, where the spacer layer includes two materials—a semiconductor and a polymer. At least one of the dyads in the filters of this disclosure has a transparent organic material as a dielectric layer. In some embodiments, all of the dyads of the multi-layer stack can contain transparent organic materials as the dielectric.

The simple interference type optical filter design can be based on the principle of a Fabry-Perot (FP) interferometer. A single FP interference filter can include a spacer or cavity layer bounded by two high reflectance coatings. Interference in the spacer can cause high transmission of resonant wavelengths over a certain bandwidth. Spacer optical thickness (the product of the refractive index and the physical thickness) is usually on the order of one quarter to one half of the resonant wavelength. For an optical display filter the passband (or bandpass) is a region of the transmission or spectrum that allows transmission of a large number of contiguous wavelengths of electromagnetic radiation. The stopband is a region of the reflection spectrum that blocks or reflects a large number of contiguous wavelengths of electromagnetic radiation. For example, the optical filters of one embodiment of this invention can have a passband region between the wavelengths of 450 nm to 650 nm where the average transmission is greater than 40% with respect to a normal view (viewing angle of 0°). In other embodiments the optical filters can have a passband region between the wavelengths of 450 nm and 650 nm of greater than 50%, greater than 60%, or even greater than 70%. By adding additional dyads creating two or more FP filters in series ("stack"), more rectangular and/or broader passbands or stopbands with better edge suppression can be achieved compared to that which can be achieved with just a single FP filter.

The optical display filter can, optionally, include a dielectric basecoat layer disposed on the substrate. Organic basecoat layers, and especially basecoat layers that include crosslinked acrylate polymers, are especially preferred. Most preferably, the basecoat layer can be formed by flash evaporation and vapor deposition of a radiation-crosslinkable monomer (e.g., an acrylate monomer), followed by crosslinking in situ (using, for example, an electron beam apparatus, UV light source, electrical discharge apparatus or other suitable device), as is well known to those skilled in the art. If desired, the basecoat can also be applied using conventional coating methods such as roll coating (e.g., gravure roll coating) or spray coating (e.g., electrostatic spray coating), then crosslinked using, for example, UV radiation. The desired chemical composition and thickness of the basecoat layer will depend in part on the nature of the support. For example, for a PET support, the basecoat layer preferably is formed from an acrylate monomer and typically will have a thickness from about a few nanometers up to about 10 micrometers (μm).

The adhesion of the first electrically-conductive layer of the FP stack to the substrate or the basecoat layer, or an abrasion-resistant layer (hardcoat), if present, can be further improved by including an adhesion-promoter to the substrate or the basecoat layer or the hardcoat. The adhesion-promoting layers can be, for example, a separate polymeric layer or a metal-containing layer such as a layer of a metal, an alloy, an oxide, a metal oxide, a metal nitride, or a metal oxynitride such as those disclosed in U.S. Pat. No. 3,601,471 (Seddon) or U.S. Pat. No. 3,682,528 (Apfel et al.) and include, for example, Cr, Ti, Ni, NiCr alloys, or ITO. The adhesion-promoting layer may have a thickness of from a few nanometers (e.g., 1 nm or 2 nm) to about 10 nm, and can be thicker if desired. The interlayer adhesion-promoting layers that can be utilized may also act as diffusion barriers. Examples of adhesion promotion layers with diffusion barrier properties include aluminum, aluminum oxide, copper, copper oxides, silicon, silicon oxides, titanium, titanium oxides, titanium nitride, titanium tungstate, tantalum, tantalum oxides, tantalum nitride, chromium, chromium oxides, and silicon nitrides. Suitable adhesion-promoting additives include mercaptans, thiol-containing compounds, acids (such as carboxylic acids or organic phosphoric acids), triazoles, dyes, and wetting agents. Ethylene glycol bis-thioglycolate, and phenylthioethyl acrylate (PTEA) are particularly preferred additives. The additive preferably is present in amounts sufficient to obtain the desired degree of increased adhesion, without causing undue oxidation or other degradation of electrically-conductive layers. Corona treatment or plasma discharge can also be used to increase adhesion to the support layer or dielectric layers.

The smoothness, continuity, and conductivity of the first metal layer of the FP stack and its adhesion to the support preferably are enhanced by appropriate pretreatment of the support. A preferred pretreatment regiment involves electrical discharge pretreatment of the support in the presence of a reactive or non-reactive atmosphere (e.g., plasma, glow discharge, corona discharge, dielectric barrier discharge or atmospheric pressure discharge); chemical pretreatment; flame pretreatment; or application of a nucleating layer such as the oxides and alloys described in U.S. Pat. Nos. 3,601,471 and 3,682,528 and PCT Pat. Publ. No. WO2008/083308 (Stoss et al.) These pretreatments help ensure that the surface of the support will be receptive to the subsequently applied metal layer. Plasma pretreatment is particularly preferred for certain embodiments. Similar pretreatments or application of a nucleating layer are preferably used on each dielectric layer before deposition of each electrically-conducting layer.

Appropriate chemical treatments of metal layer surfaces and interfaces can help to improve corrosion resistance. Such treatments can be combined with adhesion promoting treatments using similar or different materials, and with plasma treatments, diffusion barriers, and nucleating layers. One or more corrosion inhibiting compounds can be included in the support, the polymers layers, the adhesive, and/or the abrasion-resistant coating. Improved corrosion resistance can be accomplished by exposing a metal surface or interface to a compound such as a mercaptan, a thiol-containing compound, an acid (such as carboxylic acids or organic phosphoric acids), a triazole, a dye, a wetting agent, an organic sulfide, such as PTEA, or a disulfide, ethylene glycol bis-thioglycolate, a benzotriazole or one of its derivatives such as are described in U.S. Pat. No. 6,376,065 (Korba et al.), U.S. Pat. No. 7,148,360 (Flynn et al.), 2-mercaptobenzoxazole, 1-phenyl-1H-tetrazole-5-thiol, and glycol dimercaptoacetate as described in U.S. Pat. No. 4,873,139 (Kinosky), and U.S. Pat. No. 6,357,880 (Epstein et al.) All of these patents are herein incorporated by reference.

The electrically-conductive dyads of the FP stack can be made from a variety of materials. The electrically-conductive layer can include a conductive elemental metal, a conductive metal alloy, or a conductive metal oxide, a conductive metal nitride, a conductive metal carbide, or a conductive metal boride. Preferred conductive metals include elemental silver, copper, aluminum, gold, palladium, platinum, nickel, rhodium, ruthenium, aluminum, and zinc, with silver being especially preferred. Alloys, such as stainless steel, or dispersions containing these metals in admixture with one another or with other metals also can be employed. Transparent conductive metal oxides (TCO) such as indium-tin-oxide (ITO), indium-zinc-oxide (IZO), other TCOs, or combinations thereof can also be used as an electrically-conductive layer. When conductive metal oxides are used as an electrically-conductive layer, the spacer layer can have a resistivity that is at least about 100 times higher than the metal oxide. When additional electrically-conductive layers are employed, they can be the same as or different from one another, and need not have the same thickness. Preferably the electrically-conductive layer or layers are sufficiently thick so as to be continuous, and sufficiently thin so as to ensure that the film and articles employing the film will have the desired degree of EMI shielding and visible light transmission. Preferably the physical thickness of the electrically-conductive metallic layer or layers is from about 3 nm to about 50 nm, more preferably from about 5 nm to about 20 nm, whereas the physical thickness of TCO layers are from about 10 nm to about 500 mm, more preferably from about 20 nm to about 300 nm. Typically the electrically-conductive layer or layers are formed by deposition on the above-mentioned support using techniques employed in the film metallizing art such as sputtering (e.g., planar or rotary magnetron sputtering), evaporation (e.g., resistive or electron beam evaporation), chemical vapor deposition (CVD), metalorganic CVD (MOCVD), plasma-enhanced, assisted, or activated CVD (PECVD), ion sputtering, and the like.

It can be advantageous to deposit a metal oxide nucleation layer on the substrate, the basecoat layer, the abrasion-resistant layer, or on organic layers, especially crosslinked polymer, to produce optical filters that have high optical transmission and high electrical conductivity with a metal electrically-conductive layer, particularly when the metal is a very good conductor such as silver or silver alloy. The use of zinc oxide or aluminum-doped zinc oxide (AZO) as a nucleation or seed layer on the basecoat layer or on organic layers contiguous to the metallic layers of the FP stack used in the filter of this invention is described more fully in PCT Pat. Publ. No. WO 2008/083308 (Stoss et al.)

At least one of the dyads in the multi-layer stack includes a thin electrically-conductive layer and a thin transparent organic layer with a refractive index greater than 1.49 as the dielectric layer. The organic layers in the multi-layer stack can be used as a spacer in the multilayer stack and can include a dielectric material. The organic layer can be selected from polymers, organometallic materials and organic-inorganic hybrid materials. Examples of organometallic and organic-inorganic hybrid materials are given in U.S. Pat. Publ. No. 2008/0160185 (Maki et al.) and U.S. Pat. App. Publ. No. 2011/0081502 (Bright et al.) both of which are herein incorporated by reference. For the present optical filters, polymers, especially crosslinked polymers, are preferred as one or more of the dielectric layers in order to meet the optical requirements of transparent EMI shielding, for example, when the filters are used as plasma display panel filters. Examples of crosslinked polymers that are useful in the optical filters of this invention are disclosed in U.S. Pat. No. 6,818,291 (Funkenbusch et al.) herein incorporated by reference.

The crosslinked polymeric layers can be formed from a variety of organic materials. Preferably the polymeric layer is crosslinked in situ atop the first metal or alloy layer. If desired, the polymeric layer can be applied using conventional coating methods such as roll coating (e.g., gravure roll coating) or spray coating (e.g., electrostatic spray coating), then crosslinked using, for example, UV radiation. Most preferably the polymeric layer is formed by flash evaporation, vapor deposition and crosslinking of a monomer as described above for the basecoat layer. Volatilizable acrylamides (such as those disclosed in U.S. Pat. Publ. No. 2008/0160185 (Endle et al.)) and (meth)acrylate monomers are preferred for use in such a process, with volatilizable acrylate monomers being especially preferred. Fluorinated (meth)acrylates, silicon (meth)acrylates and other volatilizable, free radical-curing monomers can be used. Coating efficiency can be improved by cooling the support. Particularly preferred monomers include multifunctional (meth)acrylates, used alone or in combination with other multifunctional or monofunctional (meth)acrylates, such as phenylthioethyl acrylate, hexanediol diacrylate, ethoxyethyl acrylate, phenoxyethyl acrylate, cyanoethyl(mono) acrylate, isobornyl acrylate, isobornyl methacrylate, octadecyl acrylate, isodecyl acrylate, lauryl acrylate, beta-carboxyethyl acrylate, tetrahydrofurfuryl acrylate, dinitrile acrylate, pentafluorophenyl acrylate, nitrophenyl acrylate, 2-phenoxyethyl acrylate, 2-phenoxyethyl methacrylate, 2,2,2-trifluoromethyl (meth)acrylate, diethylene glycol diacrylate, triethylene glycol diacrylate, triethylene glycol dimethacrylate, tripropylene glycol diacrylate, tetraethylene glycol diacrylate, neopentyl glycol diacrylate, propoxylated neopentyl glycol diacrylate, polyethylene glycol diacrylate, tetraethylene glycol diacrylate, bisphenol A epoxy diacrylate, 1,6-hexanediol dimethacrylate, trimethylol propane triacrylate, ethoxylated trimethylol propane triacrylate, propylated trimethylol propane triacrylate, tris(2-hydroxyethyl)-isocyanurate triacrylate, pentaerythritol triacrylate, phenylthioethyl acrylate, naphthloxyethyl acrylate, EBECRYL 130 cyclic diacrylate (available from Cytec Surface Specialties, West Paterson, N.J.), epoxy acrylate RDX80095 (available from Rad-Cure Corporation, Fairfield, N.J.), CN120E50 (available from Sartomer, Exton, Pa.), and mixtures thereof. A variety of other curable materials can be included in the crosslinked polymeric layer, e.g., vinyl ethers, vinyl naphthylene, acrylonitrile, and mixtures thereof.

In some embodiments it is preferable to use an organic layer that includes a crosslinked acrylate polymer that has an index of refraction greater than 1.49, greater than 1.55, or even greater than 1.60. The use of an organic layer with a refractive index greater than 1.49 can improve filter performance—especially at high viewing angle. It is known that the performance of an FP optical filter can vary with viewing angle. For example, the resonant wavelength can shift to shorter wavelengths at increasing viewing angles.

The provided optical filters can have high broadband visible transmission for wide viewing angles. The bandwidth of the transmission at any viewing angle can be defined as the width of the passband at half maximum transmission. By high broadband visible transmission it is meant that the bandwidth of the transmission at a given viewing angle spans a major portion of the visible spectrum (e.g. 450 nm to 650 nm). The provided optical filters can be designed to have broad bandwidth so that the shift to short wavelengths can be made to occur outside of the major visible region at a viewing angle of up to 40°, up to 50°, up to 60° or even up to 70°. The result is a filter that can operate without a significant perceived color shift over a wide range of viewing angles. A color shift is defined as shifting of the transmission passband (to shorter wavelengths) at wide viewing angles that results in abrupt cutoff of transmission of certain colors—especially visible red in the 620 nm to 650 nm region of the spectrum.

The effect of wavelength shift at higher viewing angles can be reduced with the use of spacer material that has a refractive index of greater than 1.49. The use of a high refractive index spacer material can also allow reduction of the thickness of the organic layer needed to get the same optical thickness as a thicker layer with a lower refractive index. Of particular interest are acrylates that include a thioacrylate. Thioacrylate monomers such as, can be used to make curable acrylate compositions that have an index of refraction of greater than or equal to about 1.54, greater than or equal to about 1.56, greater than or equal to about 1.58, or even greater than or equal to about 1.60. A particularly useful thioacrylate is phenylthioethyl acrylate. Curable (meth)acrylate compositions with refractive index above 1.49 are disclosed, for example, in U.S. Pat. No. 6,833,391 (Chisholm et al.) which is herein incorporated by reference.

The smoothness of the crosslinked polymeric layer and its adhesion to the first metal layer of the FP stack preferably are enhanced by appropriate pretreatment of the first metal layer prior to application of the crosslinked polymeric layer, or by inclusion of a suitable additive in the crosslinked polymeric layer. Preferred pretreatments include the support pretreatments described above, with plasma pretreatment of the first metal layer being particularly preferred. Preferred additives for the crosslinked polymeric layer include the basecoat layer additives described above.

The smoothness, continuity, and conductivity of any additionally applied metal layers and their adhesion to an underlying crosslinked polymeric layer preferably are enhanced by appropriate pretreatment of the crosslinked polymeric layer prior to application of the additionally applied metal layer, or by inclusion of a suitable additive in the crosslinked polymeric layer. Preferred pretreatments include the support pretreatments described above, with plasma pretreatment of the crosslinked polymeric layer and use of a ZnO or AZO nucleation layer being particularly preferred.

The physical thickness of the crosslinked polymeric layer will depend in part upon its refractive index and in part upon the desired optical or abrasion-resistant characteristics of the film. For a (meth)acrylate monomer, typically the thickness is only a few nanometers up to about 6 μm. For use in an infrared-rejecting EMI shielding film such as is required by the filters of the present disclosure that contain a Fabry-Perot stack, the crosslinked polymeric layer typically can have a refractive index of from about 1.4 to about 1.7, and preferably can have an optical thickness of from about 5 nm to about 200 nm.

The organic layer can be applied using conventional coating methods such as roll coating (e.g., gravure roll coating) or spray coating (e.g., electrostatic spray coating), and then can be crosslinked using, for example, electron beam or UV radiation. The organic layers of the FP stack do not need to all have the same thickness. Other conventional coating methods include, for example, solution casting, ink-jet printing, aerosol spraying, dip coating, and spin coating. Preferred methods are vacuum deposition techniques including, plasma polymerization, chemical vapor deposition (CVD, MOCVD, PECVD), vacuum sublimation, pulse laser deposition (PLD), pulse laser evaporation, polymer multilayer process (PML), liquid multilayer process (LML), and plasma polymer multilayer process (PPML). The methods used for depositing the basecoat layer outlined above can be utilized for the organic layers.

The provided optical filters comprise at least one dyad of the multi-layer stack that has an organic layer as the dielectric layer. In some embodiments other dyads of the multi-layer stack can have other materials as the dielectric layer. For example, dielectric layers can include metal oxides, metal nitrides, metal carbides, metal borides, metal oxynitrides, metal oxycarbides, metal oxyborides, and combinations thereof, e.g., silicon oxides, aluminum oxides, titanium oxides, hafnium oxides, indium oxides, tin oxides, zinc oxide, indium-tin oxide (ITO), indium-zinc oxide, tantalum oxide, zirconium oxide, niobium oxide, boron carbide, tungsten carbide, silicon carbide, aluminum nitride, silicon nitride, boron nitride, aluminum oxynitride, silicon oxynitride, boron oxynitride, zirconium oxyboride, titanium oxyboride, and combinations thereof. Hard oxide (i.e. $SiO_2$ or $TiO_2$) and high index materials are preferred.

The thickness of the inorganic layers can vary. The desired chemical composition and thickness of each inorganic layer will depend in part on the nature and surface topography of the underlying layer and on the desired optical properties and mechanical properties for the thin film assembly. The inorganic barrier layers preferably are sufficiently thick so as to be continuous, and sufficiently thin for the desired optical and mechanical properties. The smoothness and continuity of each inorganic layer and its adhesion to the underlying layer can be enhanced by pretreatments which will be discussed below. Preferably the physical thickness of each inorganic layer is from about 3 nm to about 200 nm, more preferably from about 4 nm to about 150 nm.

The inorganic layers preferably can be formed using vacuum deposition techniques such as sputtering (e.g., planar or rotary magnetron sputtering), evaporation (e.g., resistive or electron beam evaporation), various chemical vapor depositions, and other technique such as plating, sol-gel processing and the like. Most preferably the inorganic layers can be formed using sputtering, e.g., reactive sputtering. The manufacturing process of inorganic coating by sputtering, however, can be relatively slow, therefore together with raw material cost this is a considerably high cost process.

Various functional layers or coatings can be added to the optical display filter of this disclosure to alter or improve its physical or chemical properties, particularly at the surface of the filter or to the opposite side of the support. Such layers or coatings can include, for example, low friction coatings or slip particles to make the filter easier to handle during manufacturing; particles to add abrasion-resistance or diffusion properties to the filter or to prevent wet-out or Newton's rings when the film is placed next to another film or surface; anti-reflection layers to prevent glare when the optical display filter is applied to the face of an information display; optical polarizers, antistatic coatings; abrasion resistant or hardcoat materials; anti-fogging materials; magnetic or magneto-optic coatings or films; adhesives such as pressure sensitive adhesives or hot melt adhesives; primers to promote adhesion to adjacent layers; low adhesion backsize materials for use when the filter is to be used in adhesive roll form; liquid crystal panels; electrochromic or electroluminescent panels; photographic emulsions; prismatic films and holographic films or images. Additional functional layers or coatings are described, for example, in U.S. Pat. Nos. 6,352,761; 6,641,900; 6,830,713; 6,946,188; and 7,150,907 (all Hebrink et al.); U.S. Pat. Nos. 6,368,699 and 6,459,514 (both Gilbert et al.); U.S. Pat. No. 6,737,154 (Jonza et al.); U.S. Pat. No. 6,783,349 (Neavin et al.); and U.S. Pat. No. 6,808,658 (Stover). The functional layers or coatings can also include anti-intrusion, or puncture-tear resistant films and coatings, for example, the functional layers described in U.S. Pat. No. 7,238,401 (Dietz). Additional functional layers or coatings can include vibration-damping film layers such as those described in U.S. Pat. No. 6,132,882 (Landin et al.) and U.S. Pat. No. 5,773,102 (Rehfeld), and barrier layers to provide protection or to alter the transmissive properties of the film towards liquids such as water or organic solvents or towards gases such as oxygen, water vapor or carbon dioxide. Additionally, self-cleaning layers, such as fluorocarbon or fluoropolymer layers known to those skilled in the art can be added. These functional components can be incorporated into one or more of the outermost layers of the optical display filter, or they can be applied as a separate film or coating.

For some applications, it may be desirable to alter the appearance or performance of the optical display filter, such as by laminating a dyed film layer to the filter, applying a pigmented coating to the surface of the filter, or including a dye or pigment in one or more of the materials used to make the filter. The dye or pigment can absorb in one or more selected regions of the spectrum, including portions of the infrared, ultraviolet or visible spectrum. The dye or pigment can be used to complement the properties of the film, particularly where the film transmits some wavelengths while reflecting others. A particularly useful pigmented layer that can be employed in the films or pre-laminates of the invention is described in U.S. Pat. No. 6,811,867 (McGurran et al.) This layer can be laminated, extrusion coated or coextruded as a skin layer on the film. The pigment loading level can be varied between about 0.01 weight percent (wt %) and about 1.0 wt % to vary the visible light transmission as desired. The addition of a UV absorptive cover layer can also be desirable to protect any inner layers of the film that may be unstable when exposed to UV radiation. The optical display filter can also be treated with, for example, inks or other printed indicia such as those used to display product identification, orientation information, advertisements, warnings, decoration, or other information. Various techniques can be used to print on the filter, such as, for example, screen printing, inkjet printing, thermal transfer printing, letterpress printing, offset printing, flexographic printing, stipple printing, laser printing, and so forth, and various types of ink can be used, including one and two component inks, oxidatively drying and UV-drying inks, dissolved inks, dispersed inks, and 100% solids ink systems.

The provided optical filters can have performance properties that can allow them to simultaneously reflect or transmit various portions of the electromagnetic spectrum. They can be designed to transmit at least 45%, at least 50%, at least 55%, at least 60%, at least 65%, or at least 70% of the actinic radiation between the wavelengths of 450 nm and 650 nm. In addition, they can also be designed to reflect less than 10%, less than 8%, less than 5%, or less than 3% of the actinic radiation between the wavelengths of 450 nm and 650 nm. And also in addition, the filters can be designed to block the passage of harmful electromagnetic interference (EMI) emission to or from display devices. The filters can provide EMI shielding of radio frequency waves and microwaves of at least 10 dB, at least 15 dB, at least 20 dB, at least 25 dB, at least 30 dB, at least 35 dB, at least 40 dB, or even at least 45 dB. These ranges are well-known by those skilled in the art and are typically regulated. The filters can have a sheet resistance of less than about 100 ohms/square, less than about 10 ohms/square, less than about 5 ohms/square, less than about 2 ohms/square, or eve less than about 1 ohm/square. The filters can also block infrared radiation by reflection of more than 95%, more than 97%, more than 98%, or more than 99% of the average near infrared radiation between 800 nm and 2500 nm.

The performance properties can be designed into the filters by the design of the dyads of the multi-layer stack. Each dyad has an electrically-conductive layer and a dielectric layer. By choosing and matching thicknesses and properties of the dyads it is possible to design multi-layer stacks that can have multiple optoelectronic properties. The performance properties of the provided optical filters include a high average transmission of radiation between the wavelengths of 450 nm and 650 nm, a low average reflectivity of radiation between the wavelengths of 450 nm and 650 nm, an average electromagnetic interference (EMI) shielding of at least 10 dB for frequencies between 100 MHz and 1 GHz, and an average near infrared radiation transmission of less than 2% at wavelengths between 800 nm and 1500 nm. The conductive layer of each dyad is the primary contributor to the amount of EMI shielding in the filter. Thicker conductive layers are able to provide greater EMI shielding. But thick conductive layers of metal reduce the transmission of visible radiation. In the provided filters the desired amount of EMI shielding is provided by multiple thin, transparent conductive layers.

A traditional, single cavity FP interference filter includes a spacer or cavity layer bounded by two metal layers. Optical interference in the spacer can cause high visible transmission of resonant wavelengths over a limited bandwidth. In the provided filters, each additional dyad is an additional resonant cavity that can transmit radiation at visible wavelengths that depend upon the optical thickness (physical thickness× refractive index) of the spacer layer and the characteristics of its two contiguous metal layers (one on each side of the spacer layer). Each resonant cavity can have a different transmission curve that is essentially bell-shaped and has a transmission maximum at the resonance wavelength (frequency). Multiple resonant cavities with different transmission maxima or bandwidths can be used to achieve a broad passband for transmission. This same multi-cavity filter with a broad visible transmission passband can provide a broad reference stopband in the near infrared because of the altered resonant conditions at these wavelengths.

For FP filters, the performance of the filter varies with angle of incidence—at increasing viewing angle, the transmission peak moves to shorter wavelength. The effect of shifting is correlated with incident angle and refractive index of the spacer—the higher the index of the spacer, the less the filter is affected by viewing angle. Therefore, when designing the filter for wide angle viewing, high index spacer material can be desirable. Additionally, the bandwidth of the provided filter can be designed to cover beyond the targeted bandpass spectral region of interests for normal incidence and broad enough to cover of targeted spectral region the at maximum designed tilt.

Optical display filters with low visible reflectance are also especially desirable to improve the filter optical performance. Conceptually, the visible reflectance of a bandpass FP filter can be lowered by adding an antireflectance (AR) coating to the outer metal layers of the FP filter stack (i.e., the first and last metal layers). The simplest form of antireflection coating for low loss is a single layer, where the optical thickness of the layer is chosen to match the optical admittance of the outer metal layer to the admittance of incident (neighboring) medium. For the provided optical display filter, the AR function may be provided by the optional basecoat layer and the topcoat (the last dielectric layer of the dyad, and/or additional layers). The bandpass optical filter can also be designed to provide electromagnetic interference (EMI) shielding in the radio frequency and microwave region of the EM spectrum. Generally, electrically conductive films can be used to provide EMI shielding. Shielding Effectiveness (SE) of an electric field is correlated with the film sheet resistance, and in far field can be approximated using the good conductor approximation:

$$SE(dB) = 20 \log(1 + Z_o/2R_s)$$

where $Z_o$ and $R_s$ are the impedance of free space (377Ω) and film sheet resistance, respectively. Low reflection bandpass optical filters with EMI shielding can be designed using the above design guidelines. However, all the properties such as EMI shielding, bandpass transmission, and reflectance are dynamically related. Designing for higher EMI shielding performance requires the filter to have a certain electrical conductivity, which correlates with the overall number and thickness of conductive layers. At the same time, electrically conductive materials such as metals are likely to have high optical loss. As a result, increasing the conductivity by increasing the number and thickness of the layers can result in lower transmission. At the same time, increasing the thickness mirror layers, such as conductive layers, can result in a narrow bandpass, or less coupling effects in a multi-cavity design. This can increase the reflection as well as provide a less-desirable transmission bandpass profile, such as a multiple-peak-like bandpass rather than a smooth and flat bandpass. Designing for low reflectance has to take into account all of the layers of the construction rather than just the basecoat and topcoat "AR coatings" as well as all other requirements, such as designing for wide-angle performance. The challenges of designing to meet all attributes such as EMI shielding, high transmission and low reflection for a certain bandwidth up to a certain viewing angle are significant. In addition, the results are highly dependent upon the deposition process, since the material properties achieved are very process-dependent. For example, the electrical and optical properties of the conductive layers such as Ag or ITO can be significantly different depending upon process conditions. Controlling these properties is critical to the construction of the interference-type FP optical filter provided herein.

Good design requires theoretical treatments of the characteristics of electromagnetic wave propagation in the FP filters which is complicated and usually requires computation methods, typically involve solving Maxwell's equations with appropriate boundary conditions for an assembly of thin films. The details of such treatments can be found in textbooks by e.g., by Macleod (Macleod 2001). The calculation of reflectance and transmittance for multilayer optical filters is lengthy even with computational tools and typically results in a very complicated function that depends on the construction details of the layers, such as layer thickness and material properties such as complex refractive index and permeability. These material properties are not only wavelength (frequency) dependent but also are process dependent. The material properties can be characterized empirically (detailed measurement methods of optical constants of thin films and material properties in microwave region can also be found in book by Liddell et al. entitled, "*Computer-aided Techniques for the Design of Multilayer Films*" (1981) and "*Microwave Electronics*" by Chen at al. Such matrix calculations can be done with programming using e.g., scientific computing software, MATHEMATICA. We also use commercially available thin film optical filter design software, The Essential MACLEOD (version 8.15.177) for design and optimization. EMI shielding effectiveness (SE) of thin film stacks is simply SE=–log T in the radio frequency and microwave region of the spectrum.

The provided optical display filters can be used to modify the radiation emitted from an electronic display device such as a plasma display panel, an liquid crystal display panel (LDC), or other devices such as the displays on cell. Optical display filters when used external to the devices can block harmful radiation being emitted from the devices and improve the visual characteristics of the desired visible radiation including increasing the contrast of the visual display. Alternatively, the provided optical display filters can protect some electronic devices from radiation external to the device. For example, touch screen devices can be temporarily "densensitized" by exposure to stray electromagnetic radiation (noise) external to the device. An optical display filter can be located between the touch screen panel and the electronic device to counteract this desensitization.

FIGS. 1-5 represent exemplary embodiments of the optical display filter of this disclosure. The thicknesses of the layers in FIGS. 1-5 are not drawn to scale. FIG. 1 is an illustration of one embodiment. In FIG. 1 provided is an optional basecoat layer 103 that is disposed upon a flexible, visibly transparent substrate 101. Disposed upon the basecoat layer is an FP stack 110 that has four repeating units (dyads). The provided optical display filters can have three, four, five, six, or even seven dyads (repeating units), although FIGS. 1-5 show only embodiments with four repeating units. The first unit includes a seed layer 104A disposed on basecoat layer 103. An electrically-conductive layer 104B is disposed on the seed layer 104A and an organic dielectric layer 104C is disposed upon the electrically-conductive layer 104B. These three layers (104A-C) make up one dyad of the FP stack. The dyad includes the seed layer 104A and the electrically-conductive layer 104B as the conductive layer of the FP stack. Thus, the embodiment illustrated in FIG. 1 has four dyads in FP stack 110. The four dyads include layers 104A-C, and the units 105, 106 and 107. The seed layer is a very thin layer that is considered part of the electrically-conductive layer of the FP stack. The embodiment shown in FIG. 1 has nine layers (the basecoat layer and four dyads with each dyad including an electrically-conducting layer and an organic dielectric layer).

Figure 2:
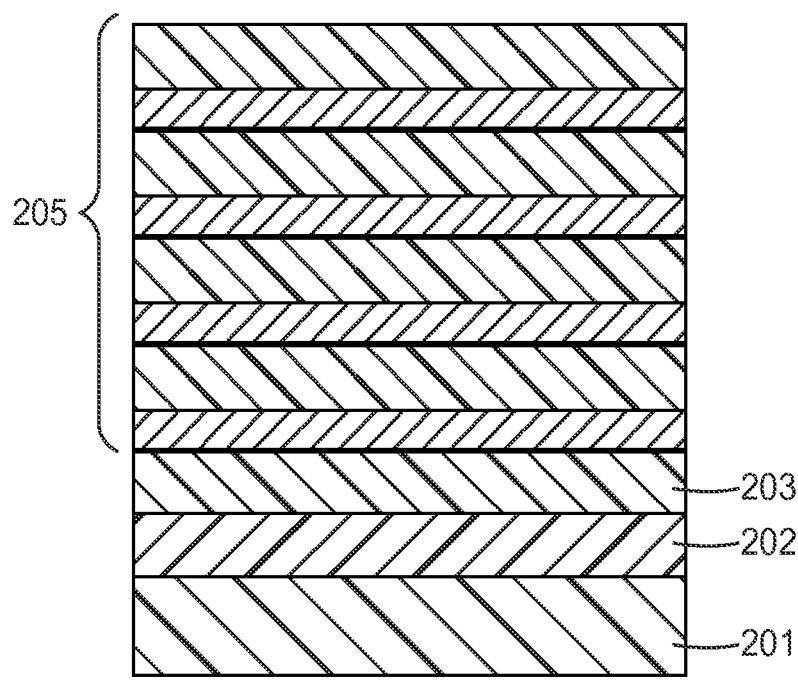
FIGS. 2-5 are cross-sectional drawings of other embodiments of optical display filters of this disclosure.

FIG. 2 is another embodiment of an optical display filter that includes substrate 201, basecoat layer 203 and four dyads 205 as the FP stack. This embodiment is similar to the embodiment of FIG. 1 except that a hardcoat layer 202 has been added between the substrate 201 and the basecoat layer 203. It has been found that when the hardcoat layer is located between the substrate and the FP stack, it provides scratch and abrasion resistance to the outside of the stack. The hardcoat layer 202 preferably has a refractive index that is approximately equal to the refractive index of the substrate 201 to minimize reflection, which can cause an undesirable iridescence effect. Optionally, the basecoat 203 can be eliminated and the four dyad FP stack 205 can be made contiguous to the hardcoat layer 202.

Figure 3:
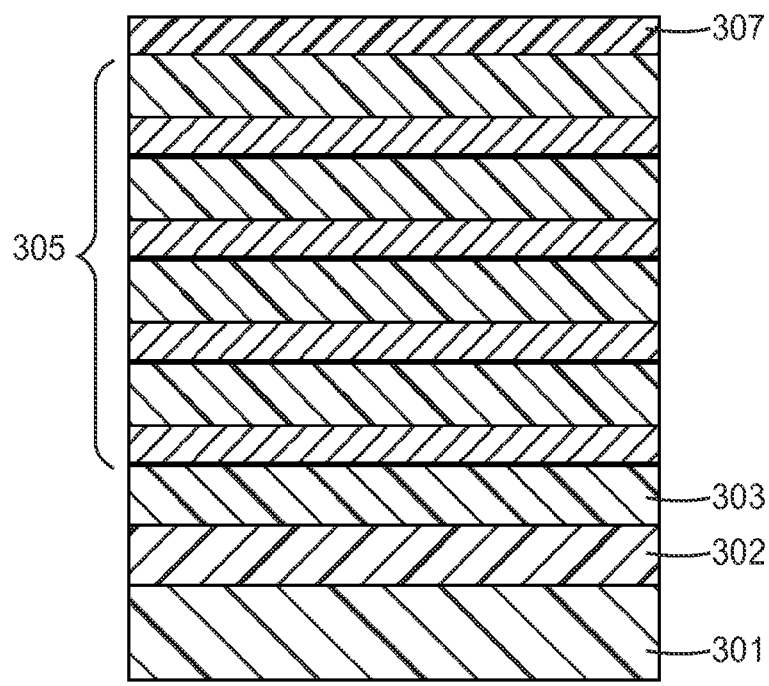

FIG. 3 is yet another embodiment of an optical display filter that has a substrate 301, a hardcoat 302, a basecoat layer 303, an FP stack with four dyads 305, and has a self-cleaning layer 307 on top of the FP stack.

Figure 4:
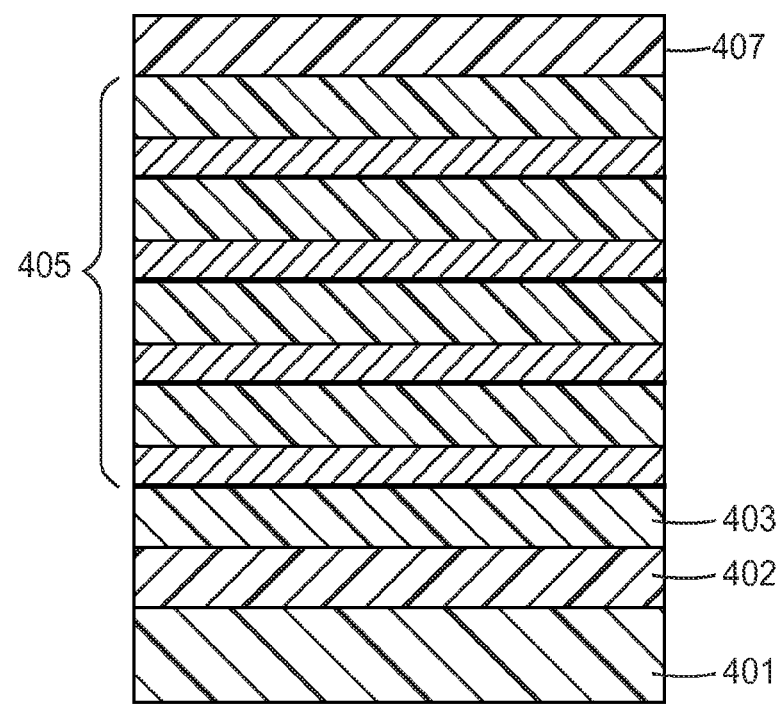

The embodiment of an optical display filter is illustrated in FIG. 4 has a substrate 401, a basecoat layer 402, a hardcoat layer 403, an FP stack with four dyads 405. A second hardcoat layer 407 that can be abrasion-resistant is shown disposed upon the FP stack.

Figure 5:
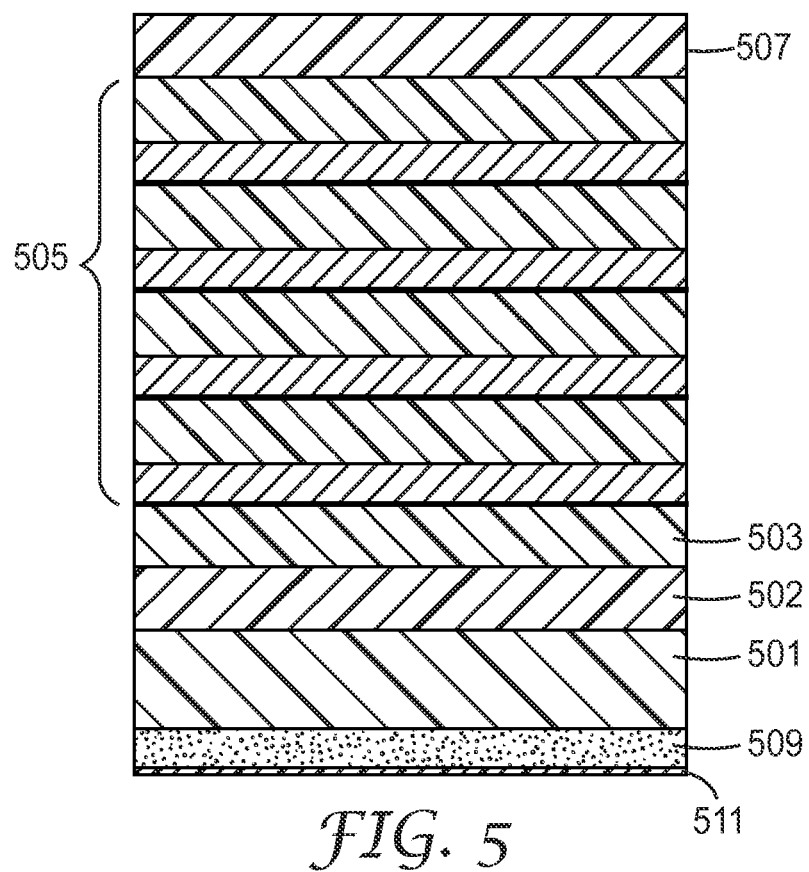

In another embodiment of an optical display filter is illustrated in FIG. 5 that includes a substrate 501, a basecoat layer 502, a hardcoat 503, an FP stack with four dyads 505, and a second hardcoat or an abrasion-resistant coating 507. Optically clear adhesive 509 is in contact with the substrate 501 on the opposite side of the basecoat layer 502 or FP stack 505. Optionally, a low adhesion backsize liner 511 can be used for easy handling of the optical filter.

The provided optical display filters are useful in combination with electroluminescent and fluorescent lamps, electronic displays such as liquid crystal displays, OLED displays, or plasma displays. The filters can modify the radiation that is emitted from these devices so as to block the transmission of unwanted or harmful wavelengths and modify the selection of wavelengths allowed to be transmitted. For example, in some embodiments the filters can block the transmission of EMI radiation and can be designed to allow visible radiation to be transmitted but not infrared. In some embodiments the filters can also filter out undesirable near IR (NIR) radiation.

EXAMPLES

Optical Analytical Method

Measurements were made on a Perkin Elmer Lambda 900 spectrophotometer fitted with a PELA-1000 integrating sphere accessory. The integrating sphere was 150 mm (6 inches) in diameter and complied with ASTM methods E903, D1003, E308, et al. as published in "ASTM Standards on Color and Appearance Measurement", Third Edition, ASTM, 1991. Samples were measured at the front sample position for total luminous transmission (TLT) and at the rear position for total luminous reflectance (TLR). Incident angles were normal (0°) and 70° for TLT and were near-normal (10°) and 70° for TLR. The front surface reflectance was measured. Portions of these samples were mounted onto 60 mm×80 mm aluminum frames about 1 mm thick to support them. Each frame had an open window 50 mm×33 mm in size. The films were attached to these frames using two-sided adhesive tape on the back side of the frame (joining to the front side of the film). For reflectance measurement, samples were typically measured with backsize exposed to air, except otherwise noted.

For Examples 2 and 3, near-normal TLR were measured with additional sample treatment to eliminate back surface reflection, in which the back sides of the mounted films were abraded using 50 μm alumina powder in a bead blasting cabinet, was then sprayed with textured black paint.

EMI Shield Analytical Method

All Measurements were performed with a coaxial TEM Cell using HP 8510 Vector Network Analyzer (available from Hewlett Packard, Palo Alto, Calif.) utilizing a 10% Span Smoothing window and complied with ASTM method D4935. The results are reported in decibels (dB). The surface resistance was measured by Eddy current method using Model 717B Benchtop Conductance Monitor, available from Delcom Instruments Inc., Prescott, Wis.

Transmission Electron Microscopy (TEM) Analytical Method

TEM sample preparation was done by room temperature ultramicrotomy. The film samples were embedded at room temperature in SCOTCHCAST Electrical Resin #5 (available from 3M, St. Paul, Minn.). Microtomed slices were cut normal to the film layers. Cutting speeds of 0.1 to 0.1 mm/sec were used. The resulting cut sections were approximately 70 nm thick. These sections were floated on distilled/deionized water and transferred onto a 3 mm, 200 mesh copper grid with a support film of carbon-coated FORMVAR.

TEM analysis was performed on a Hitachi H9000 High Resolution Transmission Electron Microscope operating at 300 kV. Images were recorded using a Gatan Model 895 ULTRASCAN CM3D camera (available from Gatan, Pleasanton, Calif.). Images were taken at various magnifications between 3,000 and 20,000×. The layer thickness measurements were made using a digital micrograph program from Gatan.

Electron Microscopy Analytical Method

SEM Sample preparation: Cross-sections of the samples were made by cutting with a razor blade under liquid nitrogen. The cross-sections were placed into a 70° Tilt SEM holder and were imaged at a 90° tilt without deposition of a conductive coating. The electron microscope was a Hitachi S-4800 field emission scanning electron microscope.

Example Fabrication

Figure 6:
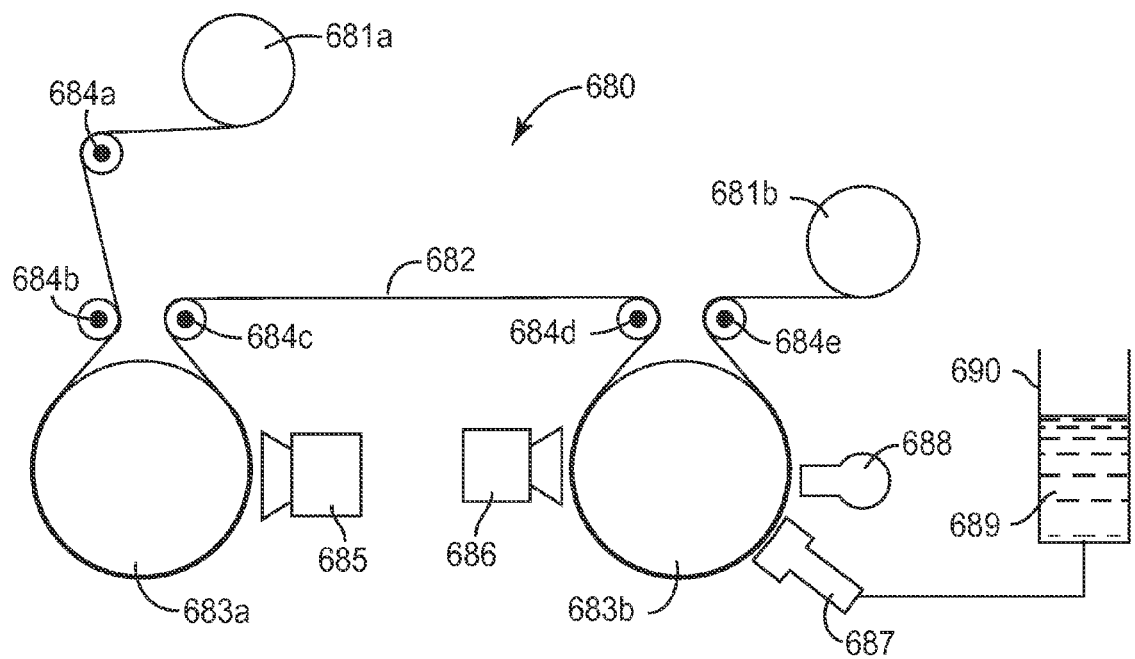
FIG. 6 is a schematic of a process for making optical display filters.

Optical grade PET film substrate (51 cm wide, DuPont Teijin Films) was loaded into a roll-to-roll vacuum chamber similar to that shown in FIG. 6 of U.S. Pat. No. 6,818,291. An apparatus 680 that can conveniently be used to manufacture films for use in the invention is shown in FIG. 6. Powered reels 681*a* and 681*b* move supporting web 682 back and forth through apparatus 680. Temperature-controlled rotating drums 683*a* and 683*b*, and idlers 684*a*, 684*b*, 684*c*, 684*d* and 684*e* carry web 682 past metal sputtering applicator 685, plasma pretreater 686, monomer evaporator 687 and e-beam crosslinking apparatus 688. Liquid monomer 689 is supplied to evaporator 687 from reservoir 690. Successive layers can be applied to web 682 using multiple passes through apparatus 680. Apparatus 680 can be enclosed in a suitable chamber (not shown in FIG. 6) and maintained under vacuum or supplied with a suitable inert atmosphere in order to discourage oxygen, water vapor, dust and other atmospheric contaminants from interfering with the various pretreatment, monomer coating, crosslinking and sputtering steps.

The pressure in the chamber was reduced to $3\times10^{-4}$ torr ($4\times10^{-2}$ Pa). The web (moving at a speed of 18 m/min) was subjected to dc-plasma treatment (1 kW) using a magnetron source with a titanium cathode under nitrogen. A degassed mixture of acrylate monomers (90% phenylthioethyl acrylate (PTEA) available from Bimax Chemicals, 5% CN120E50, available from Sartomer, 5% pentaerythritol tetraacrylate (PETA), available from Sartomer) was pumped at various flow rates to an ultrasonic atomizer discharging into a vaporization chamber. The vapor of the monomers was condensed onto the moving plasma-treated web and was crosslinked by exposure to an electron beam. The web was rewound, the acrylate layer was optionally plasma-treated, and a sputtered seed layer of $ZnO_x$ was deposited as described in U.S. Ser. No. 60/882,389, followed by the sputter deposition of a silver layer, followed by the condensation of acrylate monomers and e-beam crosslinking. The web was rewound and passed through optional plasma treatment, the seed layer deposition, silver deposition, and acrylate polymer deposition for a number of times. The thickness of the acrylate polymer and metal layers was controlled by the monomer flow rate, the sputtering power, and the web speed. The resulting optical filter had an FP stack of multiple layers of polymer (the layer on the substrate is the basecoat layer) and multiple layers of metal. The thicknesses of the silver and the acrylate layers were determined by TEM or SEM.

Example 1

The substrate was TETORON XB-3 available from DuPont Teijin Films. The fabrication method described above was used and the run conditions are tabulated in Table 1. Example 1 was an optical filter with a 4 dyad stack.

TABLE 1

Run Conditions for Example 1

| Pass | Line Speed (m/min) | Plasma Treatment (kW) | Seed Layer/ Conductive Layer | Polymer Layer |
|---|---|---|---|---|
| 1 | 18 | Ti($N_2$) 1 kW | none | PTEA mixture (1.36 $cm^3$/min, 91 nm) |
| 2 | Rewind | None | none | none |
| 3 | 18 | Ti($N_2$) 1 kW | $ZnO_x$ (4 kW)/Ag (8 kW, 15 nm) | PTEA mixture (1.10 $cm^3$/min, 71 nm) |
| 4 | Rewind | None | none | none |
| 5 | 18 | Ti($N_2$) 1 kW | $ZnO_x$ (4 kW)/Ag (8 kW, 15 nm) | PTEA mixture (0.95 $cm^3$/min, 63 nm) |
| 6 | Rewind | None | none | none |
| 7 | 18 | Ti($N_2$) 1 kW | $ZnO_x$ (4 kW)/Ag (8 kW, 15 nm) | PTEA mixture (1.00 $cm^3$/min, 66 nm) |
| 8 | Rewind | None | none | none |
| 9 | 18 | Ti($N_2$) 1 kW | $ZnO_x$ (4 kW)/Ag (8 kW, 14 nm) | PTEA mixture (0.50 $cm^3$/min, 30 nm) |

Figure 7:
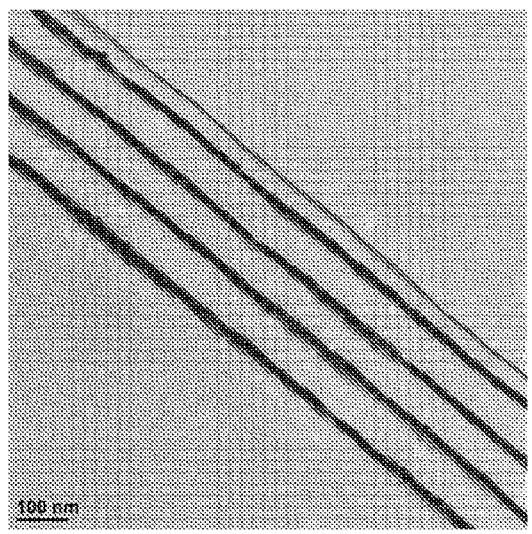
FIG. 7 is a photomicrograph of a cross-section the filter of Example 1.
Figure 8A:
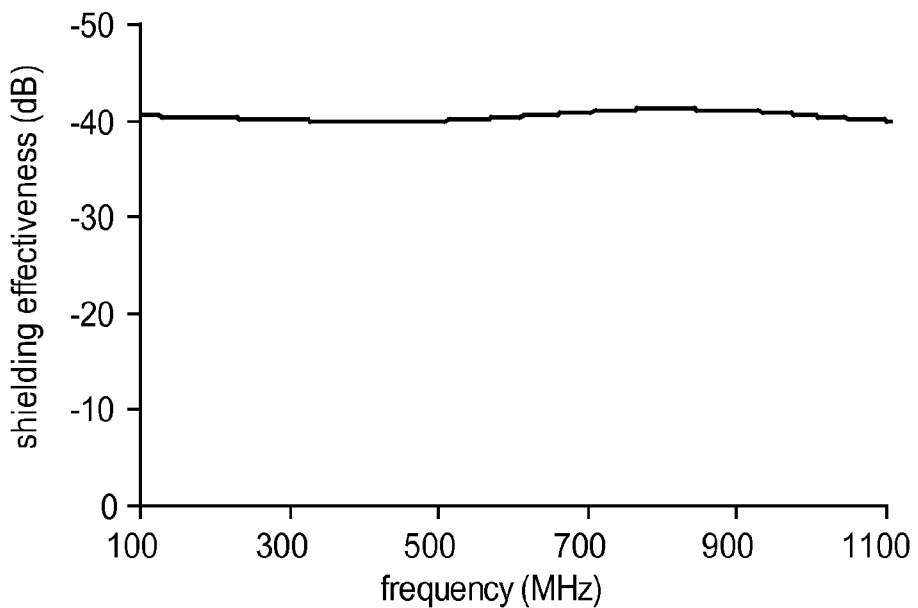
FIGS. 8A and 8B display optical performance characteristics of the filter of Example 1.
Figure 8B:
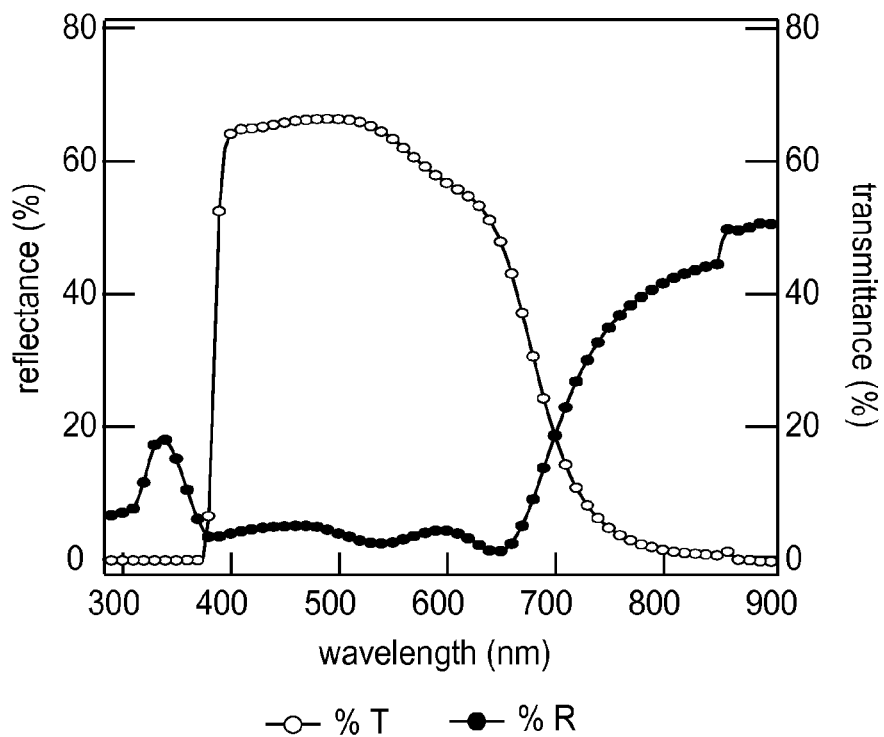

PTEA mixture: 90% PTEA + 5% CN120E50 + 5% PETA
Layer thickness measurements determined by TEM analysis The resulting optical filter had an FP stack of five layers of polymer (the layer on the substrate is the basecoat layer) and four layers of metal. FIG. 1 is a schematic of the construction of Example 1. The conditions for the runs are shown in Table 1 above. The thicknesses of the silver and the acrylate layers were determined by TEM. FIG. 7 is a photomicrograph of the FP stack of Example 1. The performance characteristics of the optical filter of Example 1 are shown in Table 4. The EMI shielding effectiveness (ASTM-D-4935) for the filter made in Example 1 is shown in FIG. 8A. A transmission and reflection spectrum of the optical filter of Example 1 is shown in FIG. 8B.

Example 2

Example 2 was run in a manner identical to that of Example 1 except that the substrate was MELINEX ST 506 film from DuPont Teijin Films and the run conditions in Table 2 were followed to form a 5 dyad optical filter.

TABLE 2

Run Conditions for Example 2

| Pass | Line Speed (m/min) | Plasma Treatment (kW) | Seed Layer/ Conductive Layer | Polymer Layer |
|---|---|---|---|---|
| 1 | 18 | Ti($N_2$) 1 kW | none | PTEA mixture (1.28 $cm^3$/min) |
| 2 | Rewind | None | none | none |
| 3 | 18 | None | $ZnO_x$ (2 kW)/Ag (5 kW, 5-10 nm) | PTEA mixture (1.10 $cm^3$/min, 78 nm) |
| 4 | Rewind | None | none | none |
| 5 | 18 | None | $ZnO_x$ (2 kW)/Ag (7 kW, 5-10 nm) | PTEA mixture (1.10 $cm^3$/min, 65 nm) |
| 6 | Rewind | None | none | none |
| 7 | 18 | None | $ZnO_x$ (2 kW)/Ag (7 kW, 5-10 nm) | PTEA mixture (1.10 $cm^3$/min, 78 nm) |
| 8 | Rewind | None | none | none |
| 9 | 18 | None | $ZnO_x$ (2 kW)/Ag (7 kW, 5-10 nm) | PTEA mixture (1.1 $cm^3$/min, 69 nm) |
| 10 | Rewind | None | none | none |
| 11 | 18 | None | $ZnO_x$ (2 kW)/Ag (5 kW, 5-10 nm) | PTEA mixture (0.52 $cm^3$/min) |

Figure 9:
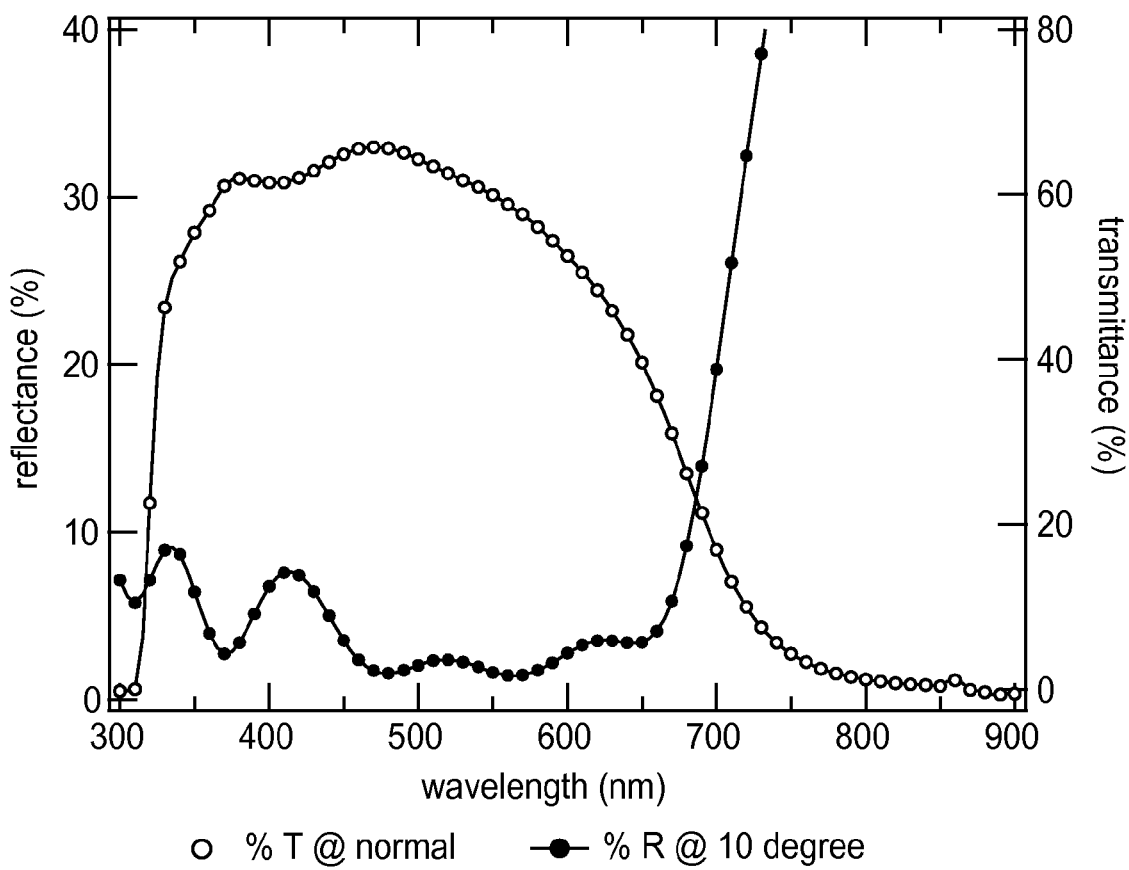
FIG. 9 displays optical performance characteristics of the filter of Example 2.

PTEA mixture: 90% PTEA + 5% CN120E50 + 5% PETA
Layer thickness measurements determined by SEM analysis The resulting optical filter had an FP stack of six layers of polymer (the layer on the substrate is the basecoat layer) and five layers of metal. This filter was designed to have high visible transmittance, low and flat visible reflectance, low electrical sheet resistance, high EMI shield, low near IR (NIR) transmittance, and low UV transmittance. The visible transmittance and reflectance curves are shown in FIG. 9.

Example 3

Example 3 was run in a manner identical to that of Example 1 except that the substrate was MELINEX ST 506 film from DuPont Teijin Films and the run conditions in Table 3 were followed to form a six dyad optical filter.

TABLE 3

Run Conditions for Example 3

| Pass | Line Speed (m/min) | Plasma Treatment (kW) | Seed Layer/ Conductive Layer | Polymer Layer |
|---|---|---|---|---|
| 1 | 18 | Ti(N$_2$) 1 kW | none | PTEA mixture (1.28 cm³/min) |
| 2 | Rewind | none | none | none |
| 3 | 18 | none | ZnO$_x$ (2 kW)/Ag (4 kW, 5-10 nm) | PTEA mixture (1.20 cm³/min, 79 nm) |
| 4 | Rewind | none | none | none |
| 5 | 18 | none | ZnO$_x$ (2 kW)/Ag (6 kW, 5-10 nm) | PTEA mixture (1.20 cm³/min, 79 nm) |
| 6 | Rewind | none | none | none |
| 7 | 18 | none | ZnO$_x$ (2 kW)/Ag (6 kW, 5-10 nm) | PTEA mixture (1.20 cm³/min, 87 nm) |
| 8 | Rewind | none | none | none |
| 9 | 18 | none | ZnO$_x$ (2 kW)/Ag (6 kW, 5-10 nm) | PTEA mixture (1.20 cm³/min, 87 nm) |
| 10 | Rewind | none | none | none |
| 11 | 18 | none | ZnO$_x$ (2 kW)/Ag (6 kW, 5-10 nm) | PTEA mixture (1.20 cm³/min, 71 nm) |
| 12 | Rewind | none | none | none |
| 13 | 18 | none | ZnO$_x$ (2 kW)/Ag (4 kW, 5-10 nm) | PTEA mixture (0.52 cm³/min) |

Figure 10:
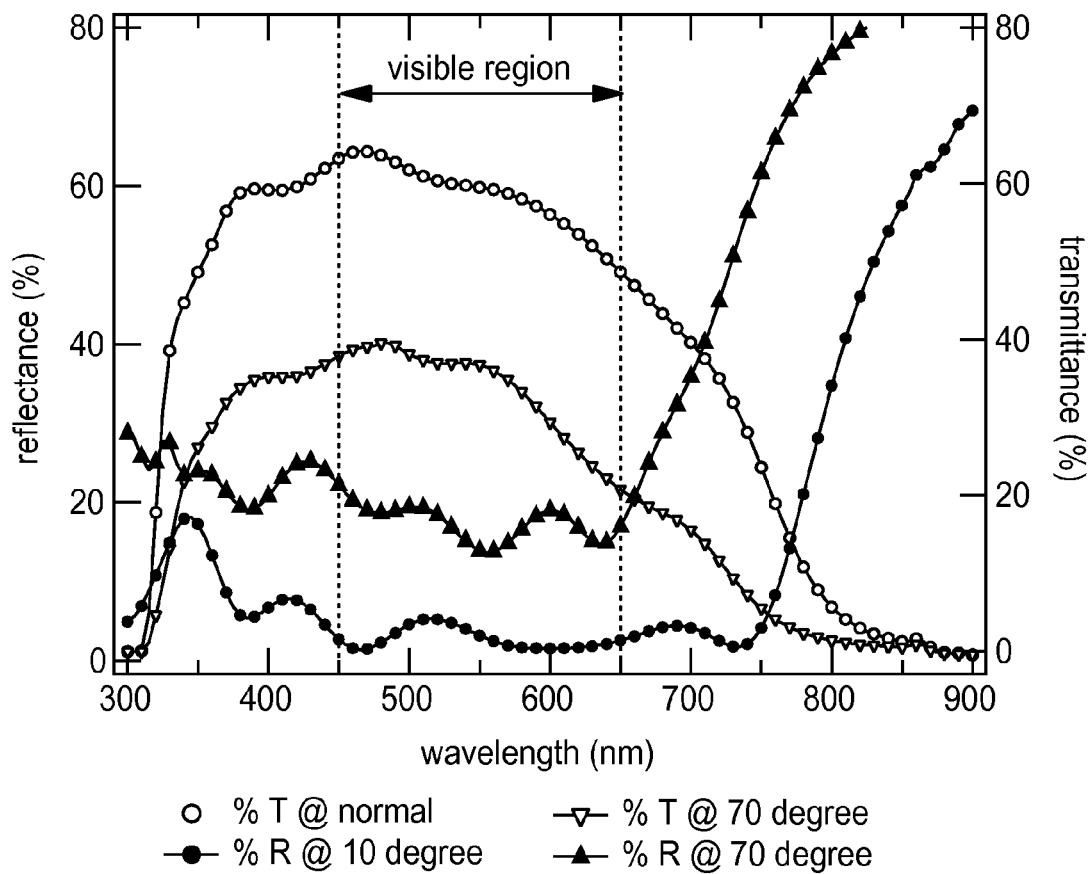
FIG. 10 displays optical performance characteristics of the filter of Example 3.

PTEA mixture: 90% PTEA + 5% CN120E50 + 5% PETA
Layer thickness measurements determined by SEM analysis The resulting optical filter had an FP stack of seven layers of polymer (the layer on the substrate is the basecoat layer) and six layers of metal. This filter was designed to have high visible transmittance, low and flat visible reflectance, low electrical sheet resistance, high EMI shield, low near IR (NIR) transmittance, and low UV transmittance. The visible transmittance and reflectance curves at two viewing angles are shown in FIG. 10. The optical filter has a wide angle transmission curve. The half width at a normal view (bandwidth at half height at transmission maximum) is 64% and spans 340 nm to 730 nm which extends beyond the normal visible spectrum (450 nm to 650 nm). The half width at a 70 degree view spans 340 nm to 660 nm which still covers the major visible region of the spectrum. Thus, there is no perceived color shift when viewed at angles from the normal view of the optical filter up to 70 degrees. Similarly, the filter of Example 3 has a wide angle low reflectance. The low and flat reflectance region at normal view ranges from 420 nm to 750 nm with a defined reflectance cutoff at 8%, which is extended beyond the major visible region of the spectrum. The low and flat reflectance region at 70 degree viewing angle ranged from 430 nm to 670 nm with a defined cutoff of 25%, which still covers the major visible region of the spectrum of 450 nm to 650 nm.

Results

Optical parameters of the optical filters made by the methods described in Examples 1-3 are tabulated in Table 4.

TABLE 4

Optical/EMI Properties of Examples 1-3

| Property | Example 1 | Example 2 | Example 3 |
|---|---|---|---|
| Visible Transmittance (wavelength 450-650 nm) | 61% | 56% | 59% |
| Visible Reflectance (wavelength 450-650 nm) | 3.5% | 2.4% | 2.7% |
| Near IR Transmittance (wavelength 800-1200 nm) | <2% | <2% | <2% |
| Sheet Resistance (ohms/square) | 1.4 ± 0.1 | 1.7 ± 0.1 | 1.7 ± 0.1 |
| Shielding Effectiveness (100-1000 MHz) | 40 ± 1 dB | 37 ± 1 dB | 38 ± 1 dB |

Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows. All references cited within this document are hereby incorporated by reference in their entirety.

What is claimed is:

1. An optical display filter comprising:
   a transparent substrate; and
   a multi-layer stack disposed on the substrate, the stack having at least four dyads, wherein at least one of the dyads is composed of:
   an electrically-conductive layer; and
   a transparent organic layer with a refractive index greater than 1.49; wherein the multi-layer stack disposed on the substrate has a reflectance for light having a near-normal incident angle of not greater than 8% of actinic radiation between the wavelengths of 450 nm and 650 nm, a reflectance for light having a 70° incident angle of not greater than 25% of actinic radiation between the wavelengths of 450 nm and 650 nm, a sheet resistivity of less than about 2 ohms/square, and an average electromagnetic interference shielding of at least 35 dB for frequencies in a range of 100 MHz to 1 GHz.

2. The filter of claim 1 further comprising a basecoat layer disposed between the substrate and the multi-layer stack.

3. The filter of claim 1 wherein all of the dyads comprise a transparent thin organic layer with a refractive index greater than 1.54.

4. The filter of claim 1 wherein the multi-layer stack disposed on the substrate has as average reflection of less than 3% of actinic radiation between the wavelengths of 450 nm and 650 nm, an average light transmission above 55% between the wavelengths of 450 nm and 650 nm, an average electromagnetic interference shielding of at least 35 dB for frequencies in a range of 100 MHz to 1 GHz, and wherein the filter has an infrared transmission at wavelengths greater than 800 nm of less than 2%.

5. A display panel comprising at least one of the optical filters according to claim 4.

6. The filter of claim 1 having a sheet resistance of less than about 1.0 ohm/square.

7. The filter of claim 1 wherein the substrate comprises a polymer.

8. The filter of claim 7 wherein the polymer comprises poly(ethylene terephthalate).

9. The filter of claim 1 wherein the electrically-conductive layer comprises an elemental metal, a metal alloy, or a metal oxide.

10. The filter of claim 9 wherein the electrically-conducting layer comprises an elemental metal.

11. The filter of claim 10 wherein the elemental metal is selected from silver, copper, rhodium, ruthenium, chromium, aluminum, gold, palladium, platinum, nickel and zinc.

12. The filter of claim 11 wherein the metal is silver.

13. The filter of claim 1 wherein the organic layer is selected from polymers, organometallic materials, and organic-inorganic hybrid materials.

14. The filter of claim 13 wherein the organic layer comprises a crosslinked polymer.

15. The filter of claim 14 wherein the crosslinked polymer is formed from monomers comprising at least one acrylate.

16. The filter of claim 15 wherein the acrylate comprises a thioacrylate.

17. The filter of claim 16 wherein the thioacrylate comprises phenylthioethyl acrylate.

18. The filter of claim 1 wherein the transmission of the film does not significantly shift in observed color up to a viewing angle of 60°.

19. The filter of claim 1 wherein the organic layer further comprises at least one of an additive, filler, dye, particles, or pigment.

20. The filter of claim 1 further comprising at least one of an optically clear adhesive, an adhesion promoter, a moisture barrier, a self-cleaning layer, a corrosion barrier, a color compensation layer, a hardcoat, and an abrasion-resistant layer.

21. The filter of claim 20 wherein at least one of the optically clear adhesive, adhesion promoter, moisture barrier, self-cleaning layer, corrosion barrier, color compensation layer, the hardcoat, or abrasion-resistant layer comprises an additive, filler, dye, pigment, particles, or a combination thereof.

22. A display panel comprising at least one of the optical filters according to claim 1.

* * * * *